United States Patent
FitzGerald et al.

(10) Patent No.: US 6,790,362 B2
(45) Date of Patent: Sep. 14, 2004

(54) EFFICIENCY MODE FOR WATER SOFTENER

(75) Inventors: Lance FitzGerald, Grayslake, IL (US); John N. VanNewenhizen, Mundelein, IL (US)

(73) Assignee: Culligan International Company, Northbrook, IL (US)

( * ) Notice: Subject to any disclaimer, the term of this patent is extended or adjusted under 35 U.S.C. 154(b) by 182 days.

(21) Appl. No.: 10/044,609

(22) Filed: Jan. 11, 2002

(65) Prior Publication Data

US 2003/0132164 A1 Jul. 17, 2003

(51) Int. Cl.[7] .............................................. B01J 49/00
(52) U.S. Cl. ...................... 210/662; 210/670; 210/687; 210/98; 210/103; 210/143; 210/190; 700/271
(58) Field of Search ................................. 210/662, 670, 210/687, 89, 96.1, 98, 103, 140, 143, 190, 191, 269; 700/67, 271, 273, 282

(56) References Cited

U.S. PATENT DOCUMENTS

| | | | | |
|---|---|---|---|---|
| 4,237,538 A | * | 12/1980 | Le Dall | 700/282 |
| 4,275,448 A | * | 6/1981 | Le Dall | 700/271 |
| 4,379,057 A | | 4/1983 | Meiser et al. | 210/662 |
| 4,385,357 A | * | 5/1983 | Davis et al. | 700/271 |
| 4,426,294 A | * | 1/1984 | Seal | 210/662 |
| 4,469,602 A | * | 9/1984 | Seal | 210/662 |
| 4,470,911 A | * | 9/1984 | Reinke | 210/662 |
| 4,490,249 A | | 12/1984 | Seal | 210/89 |
| 4,536,845 A | * | 8/1985 | DeVale et al. | 700/271 |
| 5,022,994 A | * | 6/1991 | Avery et al. | 210/670 |
| 5,045,187 A | | 9/1991 | Suchanek | 210/91 |
| 5,069,779 A | | 12/1991 | Brown et al. | 210/87 |
| 5,073,255 A | * | 12/1991 | Chili et al. | 210/96.1 |
| 5,089,140 A | | 2/1992 | Brane et al. | 210/678 |
| 5,234,601 A | * | 8/1993 | Janke et al. | 210/662 |
| 5,273,070 A | | 12/1993 | Chili et al. | 137/599.1 |
| 5,589,058 A | | 12/1996 | Bauer | 210/98 |
| 5,751,598 A | | 5/1998 | Zabinski et al. | 700/266 |
| 5,879,559 A | | 3/1999 | Schreiner et al. | 210/662 |
| 6,235,200 B1 | | 5/2001 | Mace | 210/662 |
| 6,284,132 B1 | | 9/2001 | Zimmerman et al. | 210/149 |

* cited by examiner

*Primary Examiner*—Ivars C. Cintins
(74) *Attorney, Agent, or Firm*—Greer, Burns & Crain, Ltd.

(57) ABSTRACT

The present invention provides a controller for a water softener having an ion exchange resin capable of receiving hard water ions from hard water during a softening step and releasing the hard water ions during a regeneration step. The controller includes a processor programmed to cause termination of the softening step and initiate the regeneration step when both a first and a second condition are met. The first condition is met when the resin is saturated with hard water ions, and the second condition is met when current demand for soft water is at or below a prescribed flow rate.

20 Claims, 3 Drawing Sheets

EFFICIENCY MODE FOR WATER SOFTENER

BACKGROUND OF THE INVENTION

This invention relates to a controller for a water softener. More specifically, it relates to a controller for a water softener that reduces the amount of resin that must be held in reserve prior to regeneration of the unit.

Electronic controllers have recently become very inexpensive and readily available for use in common household items. They are now regularly used for a number of appliances, including water softeners. While treating hard water, an ion exchange resin in a water softener absorbs calcium and magnesium ions from the water and replaces them with sodium ions. The resin becomes ineffective when the amount of available sodium is depleted and the resin is saturated with calcium and magnesium, and must periodically be regenerated. Water treatment is then suspended while the resin is regenerated in a multi-step process to flush the calcium and magnesium ions from the resin and restore the sodium level. The resin is first backwashed, by reversing the flow of the incoming water, to remove sediment. Next, the resin bed is contacted with a brine solution, whereby the resin takes sodium ions from the high concentration solution and displaces the calcium and magnesium ions into the brine. When an optimum amount of ion exchange has taken place, the brine solution and the unwanted hard water ions in it are discharged from the resin bed. After being rinsed to remove residual brine, the restored resin bed is then returned to service treating hard water.

Water softeners use electronic controllers to direct the timing and the opening and closing of valves during the various process steps. Some newer, more sophisticated water softeners use electronics to schedule the next regeneration cycle based on one or more inputs. The input data includes information from timers, flow meters, stored historical data on water usage and the like.

In U.S. Pat. No. 6,235,200 to Mace, a controller is disclosed for regeneration of a water conditioner. The apparatus measures water usage over a predetermined time period, and electronically stores the water usage data. Information for the same time period is averaged with similar time slots, such as the same time for previous days, or the same time period for previous weeks. The controller thereby determines time slots during which there is no water usage or when water usage is minimized. When resin saturation reaches a predetermined level, the controller determines the next regeneration time based upon historical water usage during given time periods. Actual current water usage is not used to determine appropriate regeneration periods.

A water softener controller with a microprocessor is described in U.S. Pat. No. 4,490,249 to Seal. Water usage is measured by a flow meter. Based on the flow meter data, the microprocessor determines the amount of water used since the last regeneration, and also keeps a running average of daily average soft water consumption. At a prescribed regeneration time, the microprocessor calculates the remaining resin capacity, and regeneration is initiated if the resin capacity is less than that necessary to supply the next full day's supply of soft water. Regeneration always takes place at the prescribed time of day.

The regeneration scheme used in Zabinski, U.S. Pat. No. 5,751,598, is very similar to that of Seal. Here the regeneration system is armed using information from a flow meter, a timer or electrodes that detect the impedance of the solution. Once armed, regeneration starts at the next predetermined regeneration time.

Regeneration in a multiple tank treatment system is described in U.S. Pat. No. 5,069,779 to Brown. A controller initiates regeneration of the tank currently in use when the resin in that tank reaches a predetermined saturation level. The controller also anticipates saturation of other tanks, and may regenerate the current tank early if it determines that another tank will become saturated before regeneration of the current tank is complete. Current water usage is not a concern with this system since there is a constant supply of soft water from the tanks that are not regenerating.

Schreiner, in U.S. Pat. No. 5,879,559, also teaches the combination of a mechanical clock and an electronic controller to operate a drive motor having an output shaft coupled to a valve system. A switch set by the mechanical clock, and an electronic ready signal must both be present for regeneration to occur. The ready signal is generated by a timed signal, such as the day of the week, or from a demand regeneration scheme. The demand signal is produced with input from a flow meter when water flow has exceeded a set value. Immediate regeneration may be initiated by the push of a button by the user.

All of these schemes use the electronic controllers to schedule regeneration some time in the future once some level of saturation of the resin is obtained. Because the controller schedules the regeneration to occur in the future, regeneration must be scheduled while there is sufficient resin to provide soft water during the time between the time regeneration is scheduled and the time that regeneration actually begins. If a timer initiates regeneration no more than once daily, then the reserve resin provided should be no less than that needed to provide treated water for 24 hours. The resin that is held in reserve is not used efficiently. Theoretically, it is possible that this resin will never be used to soften water. Therefore, the unit has to have resin in reserve that is rarely, if ever, used to soften water.

Withholding a portion of the resin in reserve leads to excessive salt and water usage during regeneration. Brine usage is determined based on complete saturation of the resin. If up to one third of the resin bed has not been saturated with calcium ions, the amount of brine required to regenerate could be reduced by a corresponding amount. However, because the exact saturation level of the bed is unknown, the brine usage assumes total resin saturation.

Another problem with water softeners is finding a predetermined time to regenerate when there is no current demand for soft water. Users frequently program the controller to initiate the regeneration cycle when household members are usually sleeping, for example at 2:00AM. This schedule limits initiation of regeneration to once a day, requiring that the reserve of useable resin be sufficient to meet soft water demand for at least 24 hours. Such a rigid schedule of regeneration also fails to account for unusual circumstances by the soft water users, such as when a household member desires to shower after arriving home very late at night.

None of the prior art provides for monitoring of the current water usage for the purpose of determining if regeneration should be delayed due to current soft water demand. Prior control sequences have used historical determinations as to when water usage is nil or minimized. However, none have determined that regeneration is due, then started monitoring current water usage to determine when there is no present soft water demand.

It is therefore an object of this invention to provide an improved controller for a water softener that delays regeneration if there is a current demand for soft water.

It is another object of this invention to provide an improved controller for a water softener that minimizes the amount of resin that must be kept on reserve.

It is still another object of this invention to provide an improved controller for a water softener that provides a fully automatic setting for the controller, minimizing the amount of input required from the consumer.

It is yet another object of this invention to provide an improved control sequence for a water softener that is more economical and environmentally friendly due to lower water and salt usage.

SUMMARY OF THE INVENTION

These and other objects are met or exceeded by the present invention, which features a controller for a water softener that does not delay regeneration to a preselected time of day.

More specifically, the present invention provides a controller for a water softener. The water softener has an ion exchange resin capable of receiving hard water ions from hard water during a softening step and releasing the hard water ions during a regeneration step. The controller includes a processor programmed to cause termination of the softening step and initiate the regeneration step when both a first and a second condition are met. When the resin is saturated with hard water ions, the first condition is met. The second condition is met when current demand for water is at or below a predetermined flow rate.

The water softener and controller of the present invention minimizes the inventory of reserve resin by not calling for regeneration until the bed is substantially saturated. Full use of the resin reduces the amount of resin that is needed to treat a constant volume of water. When smaller quantities of resin are required, the housing can be made smaller since the compartments for storing the resin and for storing salt can both be reduced in size and still obtain the same performance. Compact units are more easily designed for use in small homes or apartments.

When the resin is used more fully, regeneration needs to occur less frequently compared to controllers that utilize an average amount of reserve resin. Resin is held in reserve because regeneration is primarily controlled by time. At a prescribed time, regeneration begins regardless of the saturation of the remaining resin. If 20% of the resin is consistently not used in a unit that regenerates daily, an extra regeneration is required every 4 days. Sufficient salt and water are used to regenerate the entire bed, even though the reserve resin does not need regeneration. Extra water and salt usage makes operation of the softener more expensive for the user and puts a strain on the environment.

The controller of the instant invention also makes it easier for a novice or disinterested user to efficiently use his softener. One with no experience in the operation of a water softener may have no idea when or how to schedule regeneration of the unit. With the controller of this invention, the user need only answer a few questions programmed into the controller to be assured that the unit will regenerate as needed but still minimize use of water and salt.

DETAILED DESCRIPTION OF THE INVENTION

Figure 1:
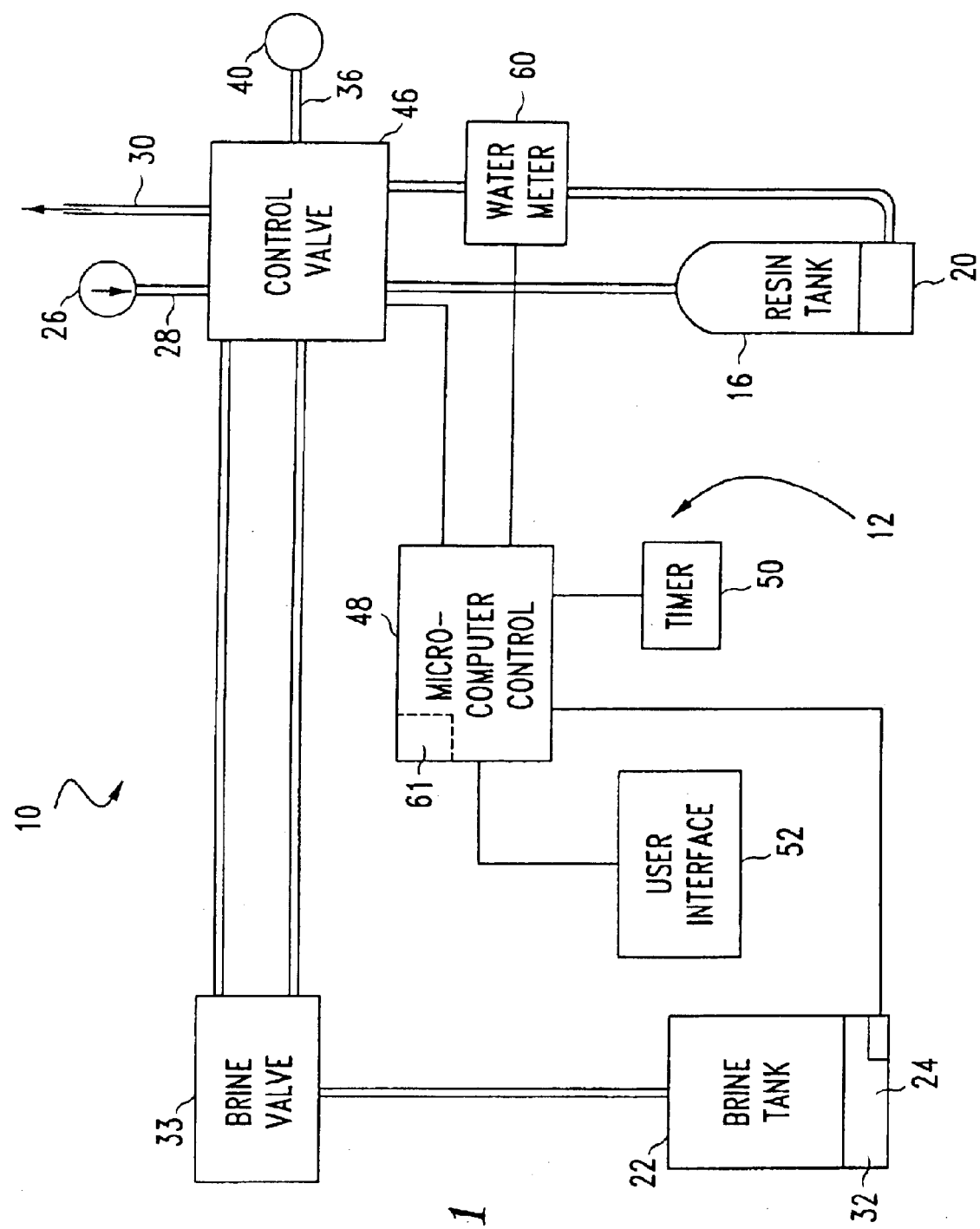
FIG. 1 is a schematic diagram of a water softener with the controller of the present invention.
Figure 2:
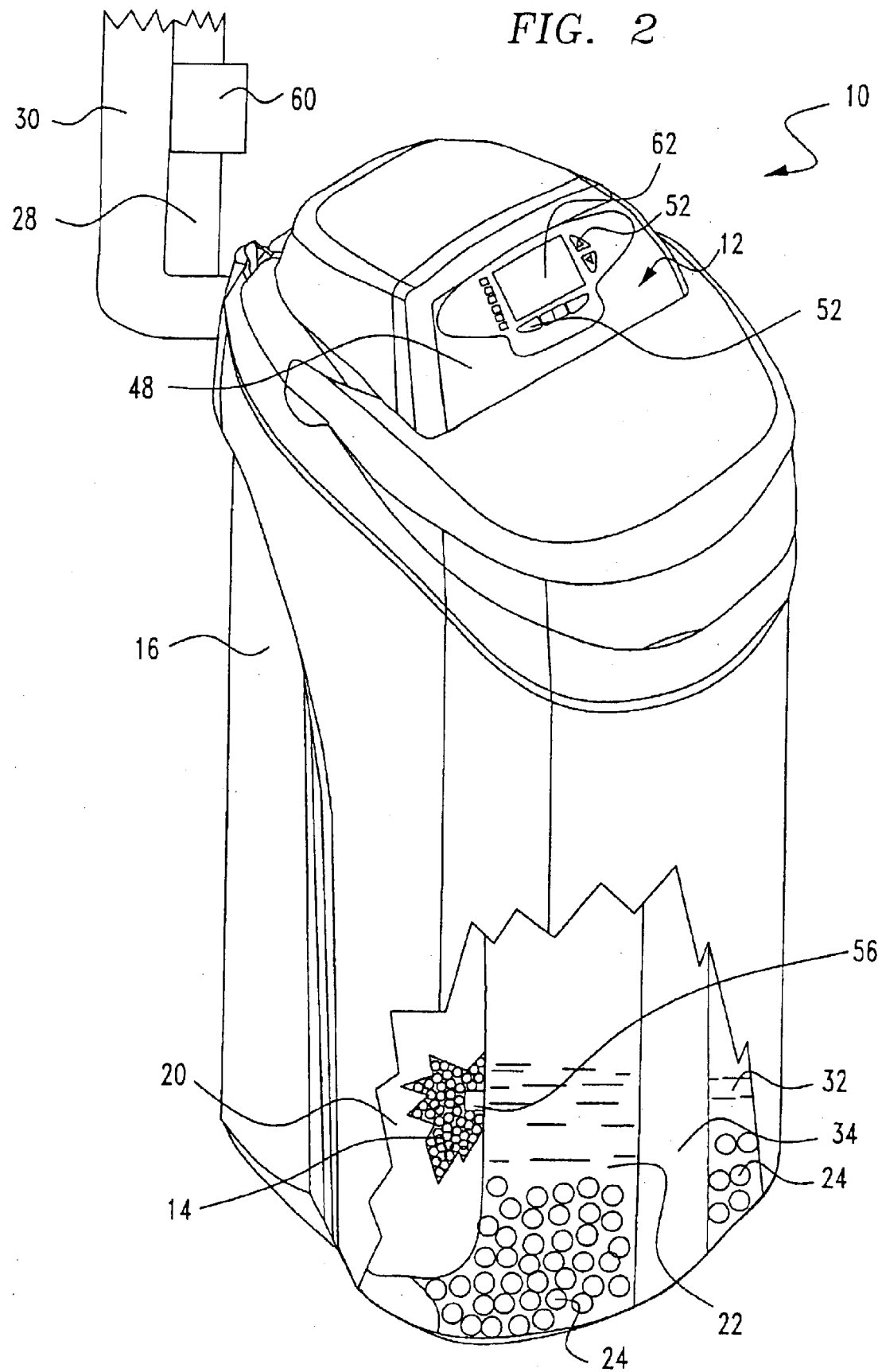
FIG. 2 is a water softener of the present invention with portions of the cabinet and resin tank cut away.

Referring to FIGS. 1 and 2, a water softener, generally designated 10, has an ion exchange resin capable of receiving hard water ions from hard water during a softening step and releasing the hard water ions during a regeneration step. The softener has controller, generally designated 12, including a processor programmed to cause termination of the softening step and initiate the regeneration step when both of a first and a second condition are met. The first condition is met when resin 14 is saturated with hard water ions and the second condition is met when current demand for soft water is at or below a predetermined flow rate.

The softener 10 includes a housing or tank 16 that holds a quantity of the ion exchange resin 14. When the softener 10 is designed for home use, the housing 16 is generally a single unit, however, a suitable softener optionally has two or more pieces that constitute the housing. In the preferred embodiment, a resin tank 20 is surrounded by a brine tank or salt chamber 22. Other softeners are known having separated resin tanks and brine tanks. For the purposes of this invention, all units are considered to be included in the housing 16.

The water softener 10 also has an amount of a softening agent 24 in the salt chamber 22. Sodium salts, such as sodium chloride in pellets, provided in a solid block or in a granular form, are the most common softening agents 24, but any solid softening agent, such as a potassium salt, is contemplated for use with this invention. High purity salts are recommended to lengthen the time between salt additions and to reduce the amount of impurities that accumulate in the bottom of the water softener 10, but salt purity does not directly effect the operation of the controller 12 or softener 10 described herein.

Referring to FIG. 1, during softening, the controller 12 operates valves to allow fresh, hard water from a supply 26 to flow into the resin tank 20 through an inlet 28, and treated or soft water exits through an outlet 30. Between the inlet 28 and the outlet 30, the hard water contacts the sodium-rich ion-exchange resin 14, where hard water ions, including calcium and magnesium ions, are received by the resin, and sodium ions are released into the soft water. Softened water is discharged from the softener 10 through the outlet 30.

When the resin 14 is saturated with hard water ions and the sodium or potassium ions are depleted, the resin is regenerated. During regeneration, a brine solution 32 is withdrawn from the salt chamber 22 through a brine valve 33 and enters the resin tank 20. A brine well 34, seen best in FIG. 2, keeps the particles of the softening agent 24 from clogging the brine valve 33, while allowing the brine solution 32 to flow freely to the valve. Hard water ions are released from the resin 14 into the brine solution 32 as sodium ions from the brine are absorbed by the resin. Spent brine 32 is removed from the resin tank 20 to a discharge pipe 36 and ultimately to a drain 40 (FIG. 1).

At the end of the regeneration cycle, water is added to the salt chamber 22 so that the softening agent 24 dissolves, making the saturated brine solution 32 to be used during the subsequent regeneration. The brine solution 32 is kept separate from the water supply 26 and resin 14 while softening is taking place so that the brine 32 does not contaminate the fresh water supplies, and because ion exchange between the resin 14 and the hard water would not occur efficiently in the presence of brine. Only during the regeneration cycle is the brine solution 32 brought into contact with the ion exchange resin 14.

Where it is necessary to have an uninterrupted soft water supply, multiple resin tanks 20 may be used so that one unit is softening while one or more others are regenerating. For home use, the entire water softener is often contained in a one-piece housing 16 or cabinet as shown in FIG. 2. Some water softener designs utilize the cabinet 16 as the salt chamber 22, allowing the softening agent 24 to be placed into the cabinet and occupy space around and between other elements of the softener 10. The resin tank 20 separates the ion exchange resin from the softening agent 24. Preferably, the resin tank 20 is a smaller tank that is housed inside the cabinet 16 of the water softener 10. However, the salt chamber 22 and the resin tank 20 may both be portions of the cabinet 16 that are separated from each other by dividers or partitions inside the cabinet, or, the salt chamber 22 and the resin tank 20 may be entirely separate tanks. Any arrangement may be used for the salt chamber 22 and resin tank 20 that keeps the water being softened from contact with the brine solution 32.

The controller 12 initiates and controls the regeneration cycle. For the purposes of this invention, the controller 12 includes one or more control valves 46, a microprocessor or micro-computer control unit 48, a timer 50, and a user interface 52. Some duties of the unit controller 12 include timing of the softening and regeneration cycles, and the opening and closing of the valves 46 as appropriate. The controller 12 may perform other tasks as well. Most modern water softening systems include a microprocessor 48 in the unit controller 10. It should be appreciated that the microprocessor 48 may have functions not specifically described in this application that are not a part of this invention, even when carried out by the same or similar equipment. Although the controller 12 of the present invention, as described, is most advantageously designed to be used with such modern water treatment systems, the controller 12 and process of this invention may also be used with less complex systems or retrofit into older water softener units 10. Use of a second microprocessor 48 dedicated to determining when to initiate regeneration is also contemplated.

Process steps are directed by the controller 12 by movement of the one or more control valves 46. In the preferred embodiment, the single valve 46 positions determine whether hard water or brine flows into the resin tank 20. Any electronically actuated valve 46 is suitable for the valve 46, including solenoid valves, or valves controlled by an electronically controlled rotary cam.

During the softening step, hard water from the supply 26 flows into the resin tank 20, then to the outlet 30 to supply soft water to the building. When the resin 14 is being regenerated, the control valve 46 is repositioned to drain brine 32 from the brine tank 22 and send it to the resin tank 20. After contacting the resin 14, the spent brine is discharged to the drain 40. The control valve 46 is also used to send water from the supply 26 to the brine tank 22, to backflush the resin 14, and perform other process steps as required by the softener 10.

The electronic controller 12 is driven by a set of instructions, preferably in the form of a software program. Preferably, software is preloaded into memory of the microprocessor 48 at the point of manufacture. Alternately, the instruction set could be loaded onto firmware, such as read-only memory for installation into the microprocessor 48. Any method of electronically storing the instructions is suitable as long as the instructions are readily available to the controller 12.

Initiation of regeneration by the controller 12 or method of the present invention is intended to be one option from among many regeneration modes. Modern electronic controllers 12 optionally offer a variety of additional ways to determine when regeneration is appropriate, depending upon the needs or preferences of the user. This scheme is particularly suitable with a compact softener 10, where space considerations limit the amount of resin 14 available to be held in reserve. However, under certain circumstances, as where the hardness of the water is very high or where certain minerals, such as iron are present, other methods of regeneration are preferred. Based on input as to the quality of the hard water, the controller 12 optionally selects, or recommends for the user to select, alternate regeneration modes that may or may not include the efficiency mode of the present invention. Alternate regeneration modes are based on the time of day, the saturation of the resin 14 or any other suitable conditions. Even though the processor 48 is programmed to use the efficiency mode, it need not offer this particular regeneration mode if the hard water quality does not warrant its use.

The high efficiency controller 12 of the present invention initiates regeneration when two independent conditions have been met. A first condition indicates that the resin 14 is saturated with hard water ions to a predetermined level. The second condition specifies that current demand for treated water is at or below a minimum flow rate. When both of these conditions have been met, the controller 12 immediately initiates regeneration without regard for the time of day or other criteria.

The resin 14 is saturated when the hard water ions have replaced a high percentage of the available soft water ions at the exchange sites. As the hard water contacts the resin 14, ion exchange usually occurs at the first opportunity the hard water ions have to exchange with soft water ions. During the softening step, a front moves through the resin bed 14 from the bed inlet to the outlet, whereby ion exchange takes place at the front. The resin 14 located toward the inlet 28 from the front is saturated, while the resin located toward the outlet 30 still holds soft water ions. When the front nears the bed outlet, the bed is saturated and regeneration is required. The physical location of the bed inlet and outlet are determined by whether the softener 10 is regenerated in an upflow or downflow fashion.

Some small reserve of resin is used to provide soft water while the controller 12 determines if the second condition is met. However, the reserve in the present system is very small compared to the prior art. The bed 14 is considered saturated when 90% of the resin holds hard water ions. Preferably, the resin 14 is at least 95% saturated before regeneration is triggered. Even more preferably, the bed 14 is saturated when the bed has the capacity to soften the average water usage for less than one hour. For the purposes of this invention, estimated saturation values of the resin 14 are sufficient.

Information as to the saturation level of the resin 14 is obtainable from a variety of sources. One preferred signal source includes one or more sensors 56 that directly monitor the condition of the resin bed 16. One or more of the hardness sensors 56, such as the Culligan AQUASENSOR®, (Culligan International, Northbrook, Ill.) could be placed in appropriate locations within the resin bed 14 to send a signal when the bed is saturated with hard water ions to a certain level. The resin 14 is considered to be saturated when the resin has a supply of sodium ions so low that it will be unable to treat a minimum amount of hard water, for example, the amount used by the household in about an hour or less. This minimum resin reserve gives the controller 12 only this short time (one hour or less) to wait until current water demand has been reduced or eliminated as discussed in greater detail below. Preferably, the resin 14 is considered to be saturated when less than 100 gallons of water is treatable or when one hour of soft water remains. After this time period has expired, the water being piped through the house will be hard water, regardless of whether or not regeneration has begun.

Another preferred source of information is a water meter 60 for estimating the saturation of the resin 14, instead of or in addition to a direct reading from the sensors 56. Demand for treated water is preferably monitored by the water flow meter 60. Preferably the meter 60 is a flow meter that measures the volume of fluid flowing through it. The meter 60 is suitably mounted either within the housing 16 or outside the housing of the softener 10. Electronic meters are preferred, however, any metering device 60 is suitable as long as it sends electrical signals to the controller 12.

Electronic memory 61 in the microprocessor 48 is used to store information needed by the microprocessor to calculate the appropriate saturation level of the resin bed 14. Data as to the volume V of water that has been treated since the last regeneration, is preferably calculated and stored by the microprocessor 48. The amount and type of resin 14 used in the softener 10 is used to calculate the approximate capacity of the resin, C, in grains of hardness. The average hardness of the incoming hard water measured in grains per gallon, H, is also required. Estimated percent bed saturation, S, is obtained by calculating the ratio of the number of hard water ions accumulated since the prior regeneration to the total number of ion-exchange sites available:

$$S=H*V/C*100.$$

Referring to FIG. 2, some of the above information is obtained by the controller by direct input of the information into the microprocessor 48. Any method of inputting data to a microprocessor 48 is suitable. Preferably, the controller includes a display 62 capable of asking for information and the user interface 52, such as keys or buttons, useful for inputting data. The capacity of the type and quantity of the resin, C, is optionally preset when the softener 10 is made. However, the average water hardness, H, will depend on the water conditions where the softener 10 is used, and thus is input by the user at the interface 64. As part of the initial set-up of the softener 10, the controller 12 should be programmed with this information, preferably by asking one or more questions on the display 62, then storing the response entered by the user with the interface 64. Alternatively, the controller 12 could receive data through a personal computer, input through voice recognition software, or any other commonly known method.

Questions asked of the user are also preferably used to provide information to the controller 12 as to the quality of the hard water used to determine the suitability of this method of scheduling regeneration. When the water is particularly hard, or where certain metals, such as iron, are present, the software optionally selects, or allows the user to select, a scheduling mode other than the efficiency mode of the present invention.

After the first condition is met, the controller begins to monitor the water flow meter 60 for water demand. The second condition is also required to be met before to initiation of the regeneration step, the "low flow" condition. Because the water bypasses the treatment step during regeneration, it is generally undesirable to begin the regeneration process while soft water is in use. Although water is available during regeneration through the bypass valve (not shown), flow is restricted compared to flow during the softening cycle. Thus, regeneration is delayed while the water demand is high, even beyond complete saturation of the resin 14, to maintain water flow rates. Thus, even when the resin 14 is essentially saturated, regeneration is delayed only very briefly until water demand is terminated or until the water demand is at or below a maximum level.

Figure 3:
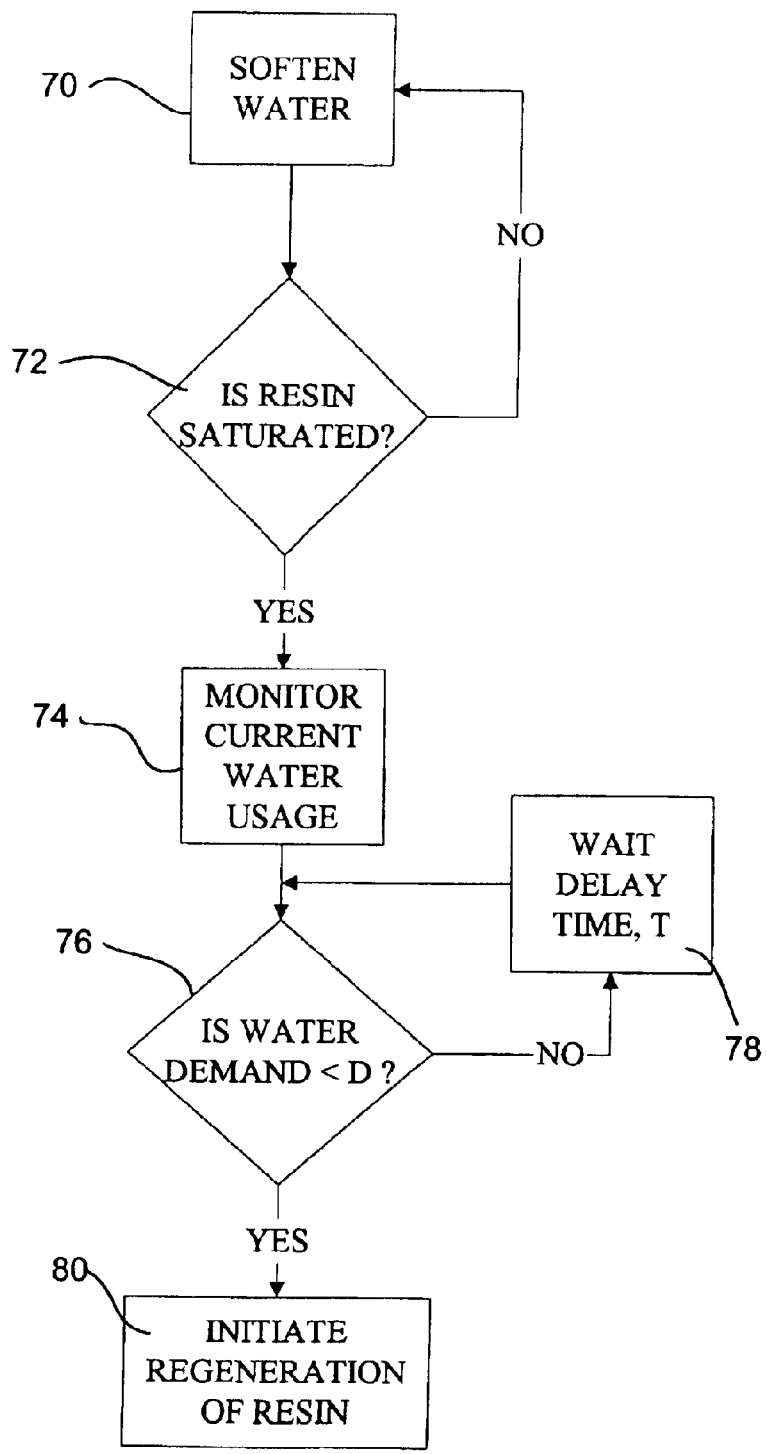
FIG. 3 is a flow diagram of the method of the present invention.

Referring now to FIG. 3, hard water contacts the ion exchange resin 14 during a softening step 70. While softening takes place, the controller periodically determines if the resin is saturated 72 by calculating S using current values of H, V and C, by checking input from a hardness sensor 56 or by any other suitable means. If the resin is not saturated, the controller 10 makes no change in the control valves 46, allowing the softener 12 to continue to treat hard water.

If the controller 10 determines that the resin is saturated 72, it then begins to monitor the current water usage 74, preferably, by reading the flow meter 60. If water demand exceeds D in step 76, the controller 12 waits a prescribed time, T, before again checking to determine if the water demand is less than D. Water demand, D, and the time, T, are determined by a variety of techniques. Numerical values, representing D and T are optionally entered at the user interface 52 and stored in the microprocessor 48 of the controller 12, making the value easily changeable. Most preferably, D is equal to 0, and T is 15 minutes. Values of D larger than zero are useful when the user is willing to allow regeneration to begin when small quantities of water are being used, such as getting a drink of water, rather than large quantities, as when taking a shower. Values of D that exceed the flow rate of water through the bypass valve (not shown) are not suitable. The maximum water demand, D, is also suitably calculated by the microprocessor 48 based upon any useful criteria, such as time of day, historical water usage, day of the week and the like. Values of T that exceed the average time to saturate the small reserve of resin 14 are unsuitable. Preferably, the delay time T is less than 30 minutes, and more preferably, less than 20 minutes. The most preferred value for T is about 15 minutes.

If current water demand exceeds D, the controller begins again monitoring the demand over a new time period 78. Only when water usage is less than D does the controller 10 initiate the regeneration step 80 immediately. No additional resin 14 is held in reserve to provide water treatment until regeneration commences at a predetermined time of day. Regeneration proceeds using any suitable process known to release the hard water ions from the resin 14 and restore sodium or potassium ions. Termination of the softening step 70 and initiation of the regeneration step 80 preferably occurs by manipulation of the control valves 46, channeling flow of water and brine to appropriate places at appropriate times.

Following regeneration, the information stored by the microprocessor 48 is optionally updated. The amount of water measured by the flow meter 60 since the previous regeneration, W, is reset to zero, and any historical data that may be useful to the controller 12, such as water usage or regeneration times should be stored and reset. Data from the flow meter 60 need not be stored or reset when the sensors 56 are used.

Regeneration is complete and the softening step is commenced when the hard water ions, Ca++ and Mg++ are removed from the resin 14 and eliminated from the softener 10 in the waste brine 36. The sodium and potassium ions from the brine replace calcium and magnesium ions, producing soft water. When the softening step begins, the controller 12 begins tracking the volume of softened water using the timer 50 provided for the purpose of estimating the next resin saturation.

While a particular embodiment of the water softener controller has been shown and described, it will be appreciated by those skilled in the art that changes and modifications may be made thereto without departing from the invention in its broader aspects and as set forth in the following claims.

What is claimed is:

1. A controller for a water softener, said water softener having an ion exchange resin capable of receiving hard water ions from hard water during a softening step and releasing the hard water ions during a regeneration step, said controller comprising a processor programmed to cause termination of the softening step and initiate the regeneration step without regard to time of day when both of a first and a second condition are met; a means for determining when the resin is saturated with hard water ions; and a means for determining when current water usage is at or below a predetermined flow rate, said first condition being met when the resin is saturated with hard water ions, and said second condition being met when current demand for water is at or below a predetermined flow rate.

2. The controller of claim 1 wherein said means for determining when the resin is saturated with hard water ions is an input from a hardness sensor.

3. The controller of claim 1 wherein said means for determining when current water usage is at or below a predetermined flow rate is data from a flow meter.

4. The controller of claim 1, wherein said controller comprises a microprocessor, one or more control valves driven by said microprocessor, a timer, and a user interface to receive input for said controller.

5. The controller of claim 1 being configured for having a prescribed delay between monitoring operations when water demand exceeds said predetermined flow rate.

6. A water softener comprising:

a housing;

an inlet to said housing for receiving inflow of hard water;

an outlet from said housing for dispensing outflow of treated water;

an ion exchange resin held within said housing for receiving hard water ions from the hard water during a softening step and releasing the hard water ions during a regeneration step;

a first means for determining when said resin is saturated with the hard water ions;

a second means for determining when current treated water demand is at or below a predetermined flow rate; and a processor programmed to cause termination of a softening step and initiate a regeneration step without regard to time of day when both of a first and a second condition are met, said first condition being met when said first means determines that said resin is saturated with hard water ions, and said second condition being met when said second means determines that the current demand for soft water is at or below the predetermined flow rate.

7. The water softener of claim 6, wherein said first means comprises an electronic hardness sensor.

8. The water softener of claim 6, further comprising electronic memory mounted on or held within said housing for storing information and calculating if said resin is saturated with hard water ions.

9. The water softener of claim 6, wherein said second means comprises a flow meter.

10. The water softener controller of claim 6 further comprising one or more control valves, wherein said processor is configured for causing termination of said softening step and initiation of said regeneration step by movement of said valves causing one or more of said valves to change position.

11. The water softener controller of claim 6 wherein said processor is further programmed with alternate modes of regeneration.

12. The water softener controller of claim 11 wherein said processor further receives input as to the quality of said hard water and offers only said alternate modes of regeneration if the water hardness is sufficiently high or if iron is present in said hard water.

13. A method for controlling a water softener containing an ion exchange resin capable of receiving hard water ions during a softening step and releasing the hard water ions during a regeneration step, said method comprising:

initiating said softening step;

determining that a first condition is met when said resin is saturated with the hard water ions;

determining that a second condition is met when current treated water demand is at or below a predetermined minimum flow rate;

terminating said softening step without regard to time of day when both of said first and second conditions are met; and initiating said regeneration step.

14. The method of claim 13 further comprising obtaining data from a hardness sensor for determining if said first condition is met.

15. The method of claim 13 wherein determining when said first condition is met comprises storing information used to make said determination.

16. The method of claim 13 wherein determining when said first condition is met comprises obtaining data from a flow meter.

17. The method of claim 13 wherein said terminating step further comprises rotating a cam.

18. The method of claim 13 wherein determining when said second condition is met comprises obtaining data from a flow meter.

19. The method of claim 18 wherein when said current water demand is above said predetermined flow rate said controller waits a delay time, then redetermines if said current water demand exceeds said predetermined flow rate.

20. The method of claim 19 wherein said delay time is less than 30 minutes.

* * * * *